Jan. 30, 1962  D. A. HALL  3,019,073
VELOCITY MEASURING DEVICE
Filed Jan. 21, 1959  3 Sheets-Sheet 2

INVENTOR
DONALD A. HALL

BY *Richard C. Reed*
ATTORNEY

Jan. 30, 1962 D. A. HALL 3,019,073
VELOCITY MEASURING DEVICE
Filed Jan. 21, 1959 3 Sheets-Sheet 3

INVENTOR
DONALD A. HALL

BY *Richard K. Reed*
ATTORNEY

United States Patent Office 3,019,073
Patented Jan. 30, 1962

3,019,073
VELOCITY MEASURING DEVICE
Donald A. Hall, 515 Ridgely Ave., Annapolis, Md.
Filed Jan. 21, 1959, Ser. No. 788,245
3 Claims. (Cl. 346—38)
(Granted under Title 35, U.S. Code (1952), sec. 266)

The invention described herein may be manufactured and used by or for the Government of the United States of America for governmental purposes without the payment of any royalties thereon or therefor.

The present invention relates to a high velocity measurement system and more particularly to a system for recording the velocity and flight position of a projectile or any other controlled object which follows a direct flight path.

Heretofore, velocity measuring devices have been used such as "on" and "off" switches triggered by the object being checked, sensing devices contacted by the object including a particular grid work, conductive screens, electronic timers, various counters, etc. These devices are usually bulky cumbersome devices which are not adapted for controlled high velocity objects. High velocity objects ionize gases which effect conducting devices such that there is an uncertainty as to the instant the conducting device was contacted and another disadvantage is, the objects must be accurately directed to be detected. Also, there is no visual means of determining the effect of flight on the object with respect to the path of flight.

The present velocity measuring system is adapted to measure velocity by optical means directing an image of the object such as a projectile onto a suitably positioned moving film. Thus, the velocity can be determined as well as obtaining a picture image from which the effects of flight can be determined by the recorded image.

It is therefore an object of the present invention to provide a simple easily constructed velocity measuring system.

Another object is to provide a system which provides an image of the object during flight.

Still another object is to provide a system for accurately measuring high velocity objects in a closed or unclosed system.

Yet another object is to provide a device for accurately determining the velocity of a projectile in a closed system without interference from other particles or gas ionization.

Figure 1:
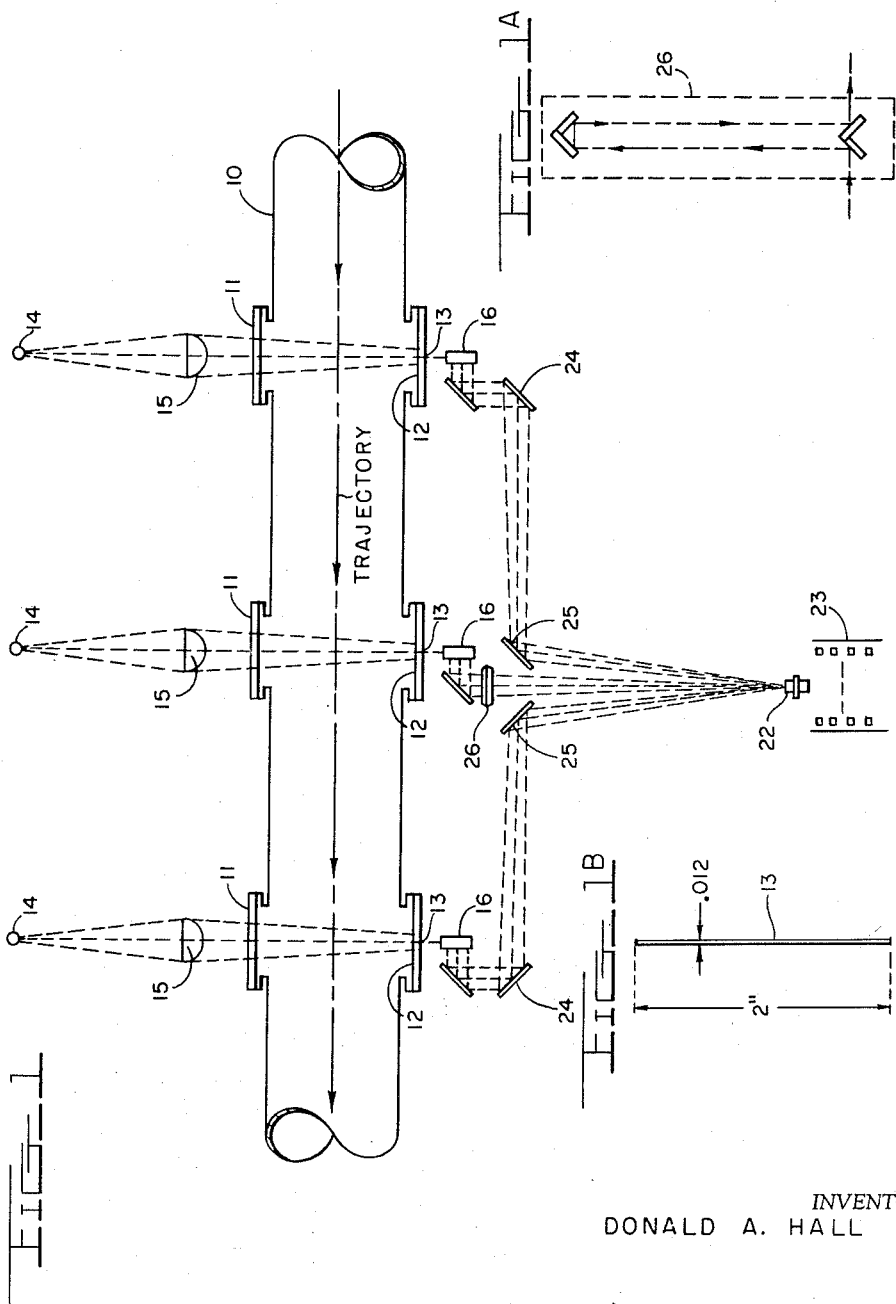
Figure 2:
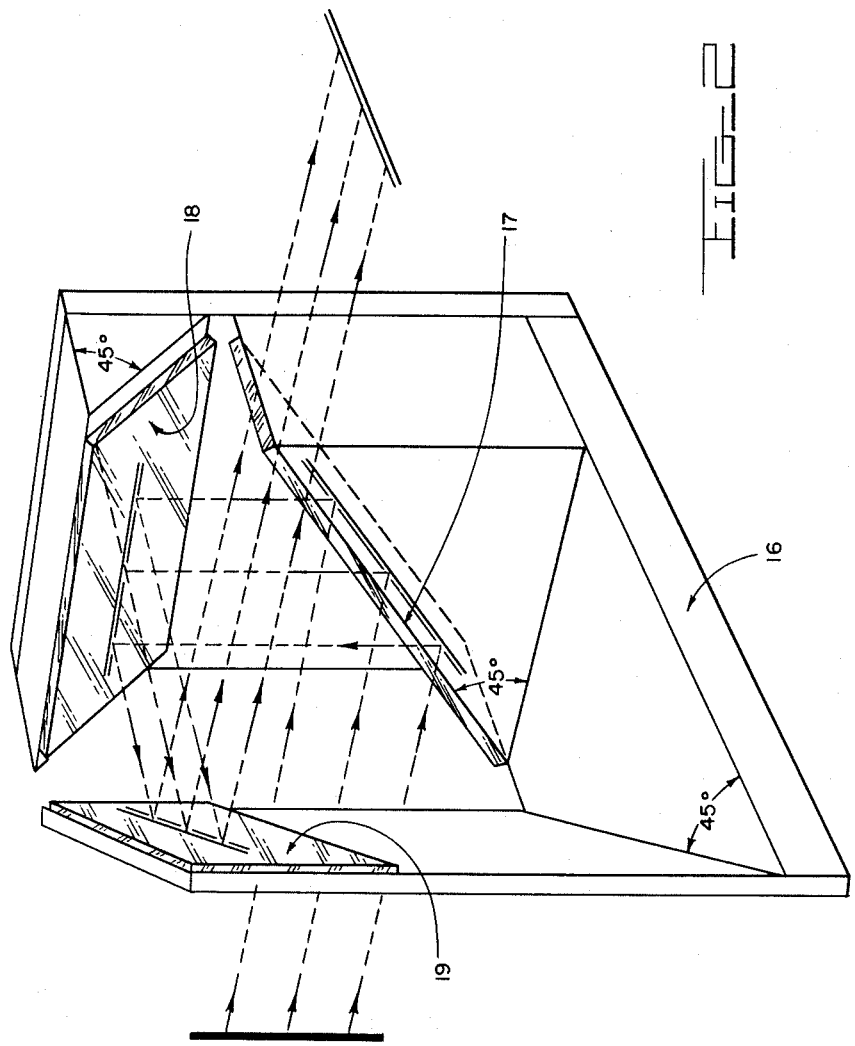
Figure 3:
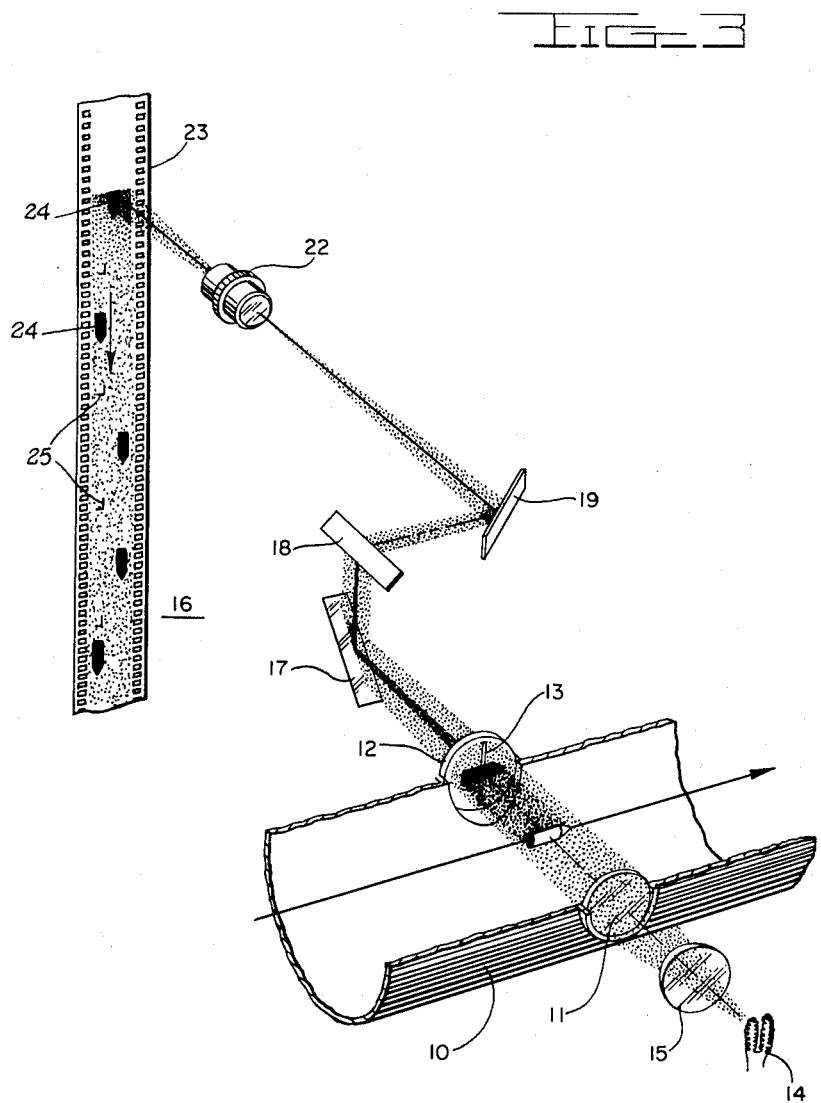

The exact nature of this invention as well as other objects and advantages thereof will be readily apparent from consideration of the following specification relating to the annexed drawings, in which:

FIG. 1 is a diagrammatic illustration of the present invention;
FIG. 1a illustrates a light path extended shown by illustration in FIG. 1;
FIG. 1b represents an optical slit in the light path;
FIG. 2 illustrates a suitable image rotator illustrated in FIG. 1 for rotating the image 90-degrees; and
FIG. 3 is a simplified diagrammatic illustration of the optical system and path for a single image path.

In accordance with the present invention, for example, a closed system, an elongated chamber is provided with three parallel slits arranged any desired distance apart along the trajectory of the object and positioned in the walls of the chamber perpendicular to a plane through the axis. A suitable optical system is provided relative to each of the slits to illuminate the object and transmit the image of the object onto a camera positioned to receive the images from all paths by suitable reflecting surfaces. The camera can be any high speed camera modified such that it does not have a shutter. Therefore, the object image will appear on the film of the camera as the film moves past the lens. Each of the optical paths are directed onto the film such that each of the images will appear along a different track of the film. From knowing the speed of the film fed through the camera and the linear displacement of the images on the film for each image produced through the optical paths, the velocity of the object can be determined. As an aid in determining the velocity, timing marks are put on the film by means of a flashing strobe light positioned relative to the camera so that the light marks appear along the edge of the film strip. The light marks together with the measured linear displacement between the projectile images permit accurate computation of the object velocity. Not only is the velocity determined, but a true image of the object appears on the film such that one can see the condition or position of the object with respect to the flight path during flight by observation of the film since three spaced images of everything traveling down the trajectory appear on the same film.

Now referring to the drawings there is shown by illustration in FIG. 1 a velocity measuring system in accordance with the present invention. The measuring system as shown includes a chamber 10 adapted to be evacuated or gas filled and connected to the end of a gun barrel or to be used under normal atmospheric pressure in the open. The chamber is provided with three equally spaced optically clear windows 11 axially arranged along one side of the chamber with three windows 12 opaque to light and positioned directly opposite windows 11. Each of the windows 12 have an optically clear slit 13 therein arranged perpendicular to the axis to permit a controlled light to pass through each of windows 12.

The system is provided with an optical system arranged relative to the windows and slits such that an image of an object such as a projectile fired along the axis of the chamber can be recorded onto a moving film. Such an optical system for one window is shown more clearly in FIG. 3 and includes a projection light 14 and a condensing lens 15 on one side of the chamber aligned with window 11. The light from the projection light passes through the condenser lens through the optical window 11 and on through the chamber and slit 13. Opposite slit 13 is located an image rotator 16 shown in FIG. 2 which comprises three optically reflecting faces 17, 18 and 19 suitably arranged to receive light through slit 13 and to direct the light through a suitable optical path into the lens 22 of a camera not shown for simplification of the drawings and onto the film 23 fed through the camera. A suitable camera such as a Wollensak Fostak Model No. WFI of standard design with the shutter removed provides a streak image without framing.

FIG. 3 illustrates a single optical system wherein the image of a projectile will be directed into a camera directly opposite the window 12. In use, as shown by FIG. 1, additional image reflectors are provided to direct the images from all of the windows into the same camera such that the images will appear on different tracks on the film strip. In order to do this, the two outermost optical paths are shown with image reflectors 24 and 25 which direct the image from the image rotator to the camera. The centermost optical path will be much shorter than the outermost paths; therefore, a light path extender 26 with four reflecting surfaces (shown in FIG. 1a) is inserted in the path of the projected image in order to make the light path the same length as that of the outermost projection paths. Otherwise the images would not be in focus on the film.

In operation, for example to determine the velocity of a projectile in flight in a closed path, the gun for firing the projectile and the system for determining the velocity is prepared for firing. The projection lamps are turned on to provide a light beam wherein the light beam is projected onto the condensing lens which acts as a collimating lens to make the light practically parallel, converging only slightly toward the slit and then through the optical system to a point at the camera lens. The camera is started and after the camera has obtained maximum speed the gun is triggered and the projectile is fired into the chamber. As the projectile enters the light beam through the chamber the projectile casts its shadow onto the slit thereby blocking the light for a height equal to the instant lateral dimension of the projectile. A reduced image of the slit, that has been blocked by the projectile shadow is focused onto the rotator and reflectors into the lens of the camera and across the fast moving 16 mm. film. As the projectile proceeds past the slit, the film is moved along the slit image in the camera, thereby wiping onto the film a profile of the projectile as it passes the slit. Since the projectile is moving along the axis of the chamber and across the slit and the film is directed perpendicular to the projectile path, the image rotator rotates the image such that the projectile image 24 will be wiped onto the film linearly along the path of film travel which is perpendicular to the line of flight.

In order to determine the speed of the projectile accurately the film speed must be constant during recording, to this end, the camera is provided with a magnetic probe located opposite the drive sprocket such that it counts the film perforation pins that pass the probe. After a preselected number of pins are counted, the gun is automatically triggered by the probe and suitable electrical circuitry and the projectile is fired. The probe also is adapted to turn the camera off after a predetermined number of pins pass the probe after the gun has been triggered. Such a triggering system is described more clearly in a copending application Serial No. 710,167, filed January 20, 1958, now Patent Number 2,925,008.

Besides the probe, the camera is associated with a flashing strobe light which flashes at 1000 flashes per second in order to indicate timing marks 25 onto the film. The timing marks 25 together with the measured displacement between projectile images permit computation of the velocity accurately and also presents a true picture of the projectile in flight. The third viewing port increases the certainty of obtaining a useful velocity record and provides means through which air drag can be determined.

The slit size in the window or ports 12 of the chamber as illustrated by FIG. 1b is two inches high and has a width of 0.012 inch and the ports are placed approximately 5 ft. apart in a 12 inch diameter chamber. These values are illustrative only and can be departed from without materially affecting the end results. Resolution of the projectile profile in the direction of motion of the film will improve as the slit opening is narrowed. Reduction of the slit width, however, reduces the exposure level on the film, thus requiring a compromise between sacrifice of exposure level and longitudinal resolution. In the present illustrated system, ample exposure of Kodak Tri-X film through the 0.012 slit is obtained with 1000-watt projection lamps "collimated" by 6-inch condensing lenses of 9-inch focal length. With an optical factor of 50 and film speed of 200 ft./sec., exposure duration is only about 0.1 microsecond. Such a system has recorded velocities up to 18,000 ft./sec. within an accuracy of about 0.29%.

Excellent images can be obtained by making the film speed equal to the projectile speed divided by the optical image reduction factor. Thus, for a film speed of 200 ft./sec. and an optical image reduction factor of 50, an undistorted profile of a projectile with a velocity of 10,000 ft./sec. can be recorded. It has been determined even with velocities of two or three times this value the profile will still be recognizable and could be readily decompressed to allow determination of projectile shape and yaw.

It has been determined that the high-speed camera could be operated with the direction of film travel parallel to the flight of the projectile in absence of the image rotator, however, satisfactory results are much more complicated to be obtained and the percentage of error is greater.

The system of the present invention has been described for measuring the velocity of a projectile in a closed system which can be evacuated, gas filled or used at atmospheric pressure. However, it is obvious that the system can be used to determine the velocity of any type object which follows a planned trajectory which can be a straight line or circular trajectory.

Obviously many modifications and variations of the present invention are possible in the light of the above teachings. It is therefore to be understood that within the scope of the appended claims the invention may be practiced otherwise than as specifically described.

What is claimed is:

1. A system for determining the velocity of and recording an image of a projectile onto a film which comprises an elongated chamber with three equally spaced pairs of oppositely disposed parallel ports in axial alignment within the surface of said chamber which forms a middle pair and two outer pairs, said ports on one side of said chamber containing optically clear windows therein, said opposing ports having optically opaque windows therein in a plane, said opaque windows having a narrow slit therein perpendicular to the axis of said chamber, an optical image projection path in alignment with each pair of said ports, each of said optical paths including a light source and a condensing lens in alignment with and opposite to said optically clear windows, a shutterless camera having a film therein moveable in a plane parallel to said slits in said chamber and positioned in alignment with said middle pair of ports on the side of said chamber opposite to said slit in said opaque window, each of said optical image projection paths having an image rotator including image reflection surfaces in optical alignment with said slit and adapted to reflect an image of said projectile onto said movable film in separate parallel tracks and in a linearly spaced relationship along the direction of motion of said film as the projectile passes each of said slits whereby the velocity can be determined in accordance to the speed of the movable film and the linear distance between each of said images recorded on said film.

2. A system for determining the velocity of and recording an image of a high velocity object onto a film which comprises aligned optical projection means in at least two separate axially spaced optical image projection paths, said projection paths being across an object trajectory path, said optical projection means in each of said separate optical image paths including a light source and a condensing lens on one side of said trajectory path, a slit and an image rotator on the opposite side of said trajectory path said slit extending in a plane perpendicular to the axis of said trajectory path, a shutterless camera positioned in optical relationship with respect to said image rotators, a movable film in said camera with the direction of motion of said film being in a plane parallel to said slits, said image projection means of each of said optical paths adapted to project an image of said object passing through said trajectory path onto spaced parallel tracks each extending along the direction of motion of said movable film in said camera, said image projected onto each separate track of said film being displaced linearly along the length thereof, whereby the velocity of the object is determined by the speed of travel of said movable film and the linear displacement between said images projected onto said film by said optical projection means.

3. A system for determining the velocity of and recording an image of a projectile onto a film which comprises an elongated chamber with at least two pairs of oppositely disposed ports equally spaced along the axis thereof, said ports on one side of said chamber having optically clear windows therein and said opposing ports having optically opaque windows therein, a slit in each of said opaque windows with the slit lying in a plane perpendicular to the axis of the chamber, an optical image projection path in alignment with each pair of said oppositely disposed windows in said chamber, each of said optical paths including a light source and a condensing lens in alignment with and opposite to said optically clear windows, image reflection surfaces including image rotators on the opposite side of said chamber from said light source in alignment with said slits, a shutterless camera positioned in optical relationship with respect to said image reflection means, a movable film in said camera adapted to move in a plane parallel to said slits and in direction parallel thereto, said image projection means of each of said optical paths adapted to project an image of an object passing across said optical path within said chamber onto said movable film in spaced parallel tracks extending along the direction of motion of said film, and linearly displaced along the length of said film whereby the velocity of the object is determined by the speed of travel of said movable film and the linear displacement between said images projected onto said film by said optical projection means.

References Cited in the file of this patent

UNITED STATES PATENTS

| | | |
|---|---|---|
| 1,137,963 | Heiland | Nov. 22, 1938 |
| 2,403,911 | Crowley | July 16, 1946 |
| 2,641,458 | Gilvarry et al. | June 9, 1953 |
| 2,769,492 | Ostergren et al. | Nov. 6, 1956 |

FOREIGN PATENTS

| | | |
|---|---|---|
| 238,861 | Switzerland | Dec. 3, 1945 |
| 744,780 | Germany | Jan. 25, 1944 |

OTHER REFERENCES

Journal of the SMPTE, December 1954 (vol. 63), pp. 240–244.